(12) United States Patent
M V et al.

(10) Patent No.: US 11,373,213 B2
(45) Date of Patent: Jun. 28, 2022

(54) DISTRIBUTION OF PROMOTIONAL CONTENT BASED ON REACTION CAPTURE

(71) Applicant: International Business Machines Corporation, Armonk, NY (US)

(72) Inventors: Vipin M V, Palakkad Dist (IN); Lakshmi Swetha Gopireddy, Ongole (IN); Gireesh Punathil, Kannur (IN)

(73) Assignee: International Business Machines Corporation, Armonk, NY (US)

( * ) Notice: Subject to any disclaimer, the term of this patent is extended or adjusted under 35 U.S.C. 154(b) by 275 days.

(21) Appl. No.: 16/435,593

(22) Filed: Jun. 10, 2019

(65) Prior Publication Data
US 2020/0387934 A1    Dec. 10, 2020

(51) Int. Cl.
G06Q 30/00    (2012.01)
G06Q 30/02    (2012.01)

(52) U.S. Cl.
CPC ..... *G06Q 30/0271* (2013.01); *G06Q 30/0277* (2013.01)

(58) Field of Classification Search
CPC ........................................ G06Q 30/0207–0277
See application file for complete search history.

(56) References Cited

U.S. PATENT DOCUMENTS 9,514,436 B2    12/2016  Marci
2002/0095679 A1*  7/2002  Bonini ............... H04N 21/4126
                                                725/74
2009/0131764 A1   5/2009  Lee
2011/0295392 A1* 12/2011  Cunnington ............. H04N 7/15
                                                700/90
2012/0106806 A1   5/2012  Folta
(Continued)

FOREIGN PATENT DOCUMENTS

CN    204423417 U     6/2015
WO    2009035764 A2   3/2009
WO    2014193161 A1  12/2014

OTHER PUBLICATIONS

Nguyen, Clinton, IBM's Watson sorted through over 100 film clips to create an algorithmically perfect movie trailer, Aug. 31, 2016, businessinsider.com, 11 pp (Year: 2016).*

(Continued)

*Primary Examiner* — Michael W Schmucker
(74) *Attorney, Agent, or Firm* — Joseph P. Curcuru

(57) ABSTRACT

Embodiments describe an approach for improving user consumption and promotion of multi-media content. Embodiments retrieve social media and location-specific context information from one or more social media platforms associated with one or more audience members. Embodiments determine a baseline mood for the one or more audience members based on the one or more audience member's social media activity and social media posts. Embodiments of capture one or more images of one or more audience member reactions while the one or more audience members view the multi-media content. Embodiments identify relevant scenes in the multi-media content based on the captured one or more audience member reactions. Additionally, embodiments generate promotional content based on the identified relevant scenes; and distribute the promotional content on the one or more social media platforms.

17 Claims, 5 Drawing Sheets

(56) References Cited

U.S. PATENT DOCUMENTS

| | | |
|---|---|---|
| 2013/0339433 A1 | 12/2013 | Li |
| 2014/0112556 A1 | 4/2014 | Kalinli-Akbacak |
| 2014/0359647 A1* | 12/2014 | Shoemake ....... H04N 21/44218 725/10 |
| 2015/0025958 A1* | 1/2015 | Gaucas ............. G06Q 30/0244 705/14.43 |
| 2015/0143392 A1 | 5/2015 | Silveira-Filho |
| 2015/0332603 A1* | 11/2015 | Aravkin .................. G09B 5/04 434/238 |
| 2015/0379989 A1* | 12/2015 | Balasubramanian ....................... G06Q 30/0267 704/233 |

OTHER PUBLICATIONS

Bost, Xavier, "A storytelling machine ? : automatic video summarization : the case of TV series", HAL archives-ouvertes.fr, submitted on Nov. 17, 2017, <https://tel.archives-ouvertes.fr/tel-01637270/document>, 197 pages.

Kehn, Dan, "IBM Watson creates first movie trailer (and it creeps me out)", Aug. 31, 2016, IBM Cloud Blog, 5 pages.

Mell et al., "The NIST Definition of Cloud Computing", NIST, U.S. Department of Commerce, Special Publication 800-145, Sep. 2011, 7 pages.

Tian et al., "Recognizing Induced Emotions of Movie Audiences: Are Induced and Perceived Emotions the Same?", 2017 Seventh International Conference on Affective Computing an Intelligent Interaction (ACII), IEEE, <http://www.cstr.ed.ac.uk/downloads/publications/2017/tian2017acii.pdf>, 8 pages.

Tsoneva et al., "Automated summarization of narrative video on a semantic level", IEEE Conference Publication, ICSC 2007, Sep. 17-19, 2007, <https://ieeexplore.ieee.org/document/4338346>, 2 pages.

Tsoneva, Tsvetomira, "Automated summarization of movies and TV series on a semantic level", ResearchGate, Eindhoven, Mar. 2007, <https://www.researchgate.net/publication/250823550_Automated_summarization_of_movies_and_TV_series_on_a_semantic_level>, 127 pages.

Hanjalic, Alan, "Extracting Moods from Pictures and Sounds: Towards Truly Personalized TV", IEEE Signal Processing Magazine, vol. 23, Issue: 2, Mar. 2006, pp. 90-100, <https://ieeexplore.ieee.org/document/1621452>.

* cited by examiner

DISTRIBUTION OF PROMOTIONAL CONTENT BASED ON REACTION CAPTURE

BACKGROUND OF THE INVENTION

The present invention relates generally to the field of multi-media promotions and audience reaction, and more particularly to improving multi-media and graphic content promotions based on an audience's reaction to multi-media.

Promotions or advertisements of any multi-media and/or graphics content, known in the art, plays an active role in sustained and improved consumption. Promotions mostly come in the form of summaries, highlights, trailers, promotional events, advertisements, and social media posts. The content of the promotions will mostly be decided by one or more editors of the multi-media and/or graphics content. The highlights and trailers generated by the editors or production company are based on the interests and/or perceived interests of the editor or production company and what the editor or production company perceives as the most interesting summary points for consumers.

SUMMARY

Embodiments of the present invention disclose a method, a computer program product, and a system for improving promotion and user consumption of multi-media content, the embodiments comprising: retrieving, by one or more processors, social media and location-specific context information from one or more social media platforms associated with one or more audience members; determining, by the one or more processors, a baseline mood for the one or more audience members based on the one or more audience member's social media activity and social media posts; capturing, by the one or more processors, one or more images of one or more audience member reactions while the one or more audience members view the multi-media content; identifying, by the one or more processors, relevant scenes in the multi-media content based on the captured one or more audience member reactions; generating, by the one or more processors, promotional content based on the identified relevant scenes; and distributing, by the one or more processors, the promotional content on the one or more social media platforms.

DETAILED DESCRIPTION

Figure 1:
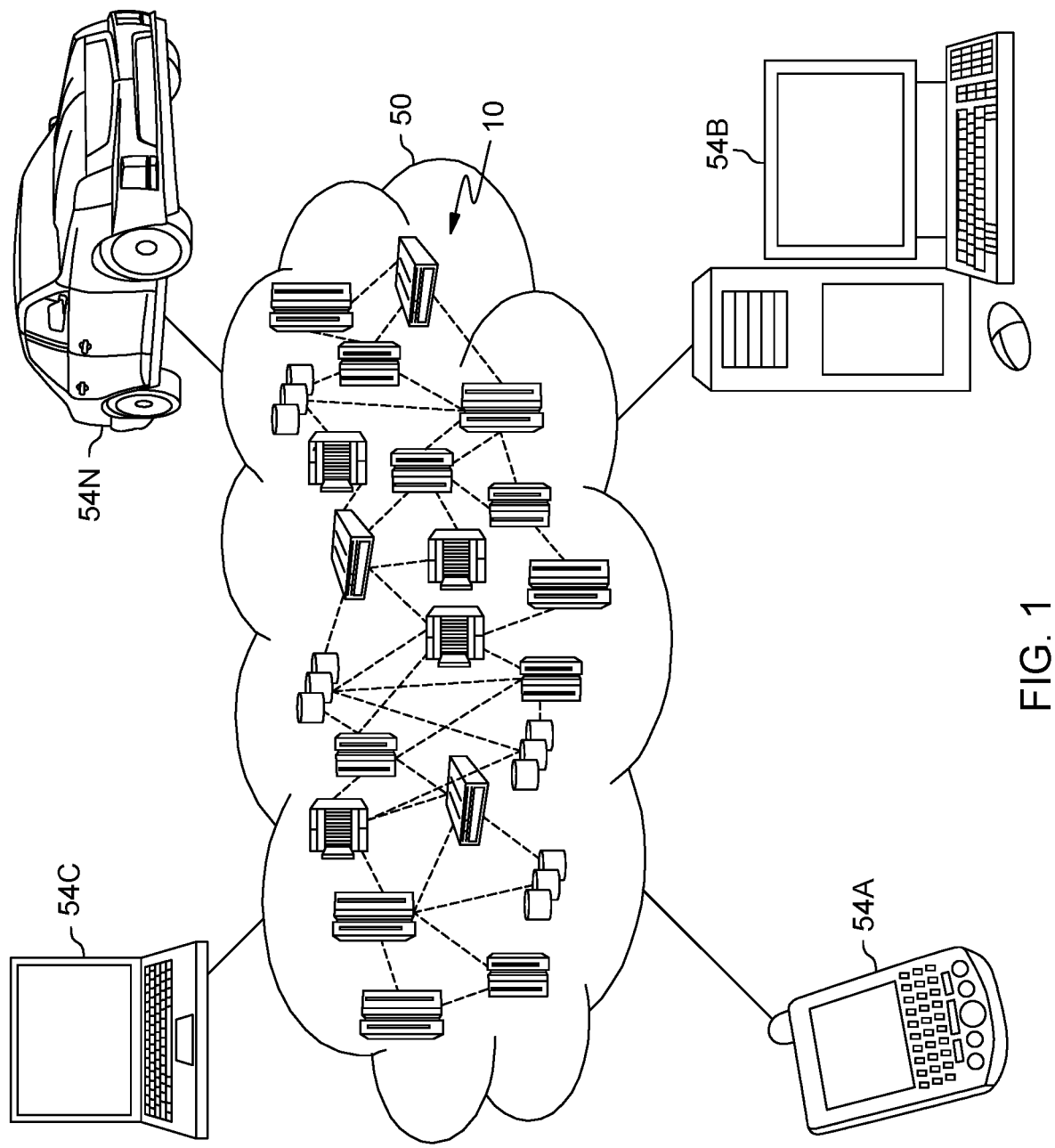
FIG. 1 depicts a cloud computing environment according to an embodiment of the present invention.

Consumers may or may not enjoy the generated promotional content distributed by media companies. To better attract the audience to multi-media or graphics content, the promotional contents may be selectively chosen based on an audience's mood-based reaction and/or social media posts.

Embodiments of the present invention can record and process upcoming or ongoing multi-media content release information. Multi-media content can be, but is not limited to, a movie, TV show, music video, video game, and/or any other form of multi-media known in the art. Multi-media content release can be, but is not limited to, a movie premiere, TV show premiere, music video premiere, a streaming release, and/or any other type of multi-media release known in the art. Multi-media content release information can be, but is not limited to, a release date, premiere date, location of the premiere, number of premiere guests, time of the premiere and/or release, etc.

Additionally, embodiments of the present invention can record and process the multi-media release's logistical and ontological attributes. Embodiments of the present invention can comprise a cloud-based application programming interface (API) that can retrieve social media information and location-specific context information of a set of select audience members viewing the multi-media content to define a baseline of the audience prior to a multi-media content release. An audience member can be, but is not limited to, a guest of a premiere, a celebrity, an online user, a social media influencer, any other person viewing a multi-media content release, and/or any other person known in the art. Social media information can be, but is not limited to, one or more audience member social media posts, likes, interests, friends/followers (e.g., amount/number of friend and followers the user has), who the set of select audience members is following, amount of people the one or more audience members are following, social media interaction (e.g., comments and/or replies), and/or any other form of social media information known in the art.

Location-specific context information is any contextual location information known in the art. For example, a user checking into a place or location, as reflected in their social profile, a place where the user is going to or has previously visited, as reflected in their social profile, an event the user has attended, as reflected in the user's social profile, or an emotional state or a mood the user is undergoing or has previously experienced, as reflected in their social profile. Embodiments of the present invention can comprise low light cameras that can capture images of the audience members in attendances. Embodiments of the present invention can further comprise an image processing system that can recognize expressions from images (e.g., captured images of audience members). In some embodiments, an audience member can be a social media user that has a high social media influence. High social media influence is determined based on an exceeded predetermined number of followers, social media posts, likes generated, comments generated and/or shared social media posts. For example, if an audience member has over three million followers and generates over 30,000 likes per post, then the audience member is determined to have a high social media influence.

Embodiments of the present invention can provide a baseline and/or preset of the mood of an audience prior to a multi-media release. Embodiments of the present invention can capture images of the audience members while the multi-media content is playing. Embodiments of the present invention can extract the mood changes and expressions of the audience members during the course of a multi-media premiere and/or while the multi-media content is streaming (e.g., playing). Embodiments of the present invention can identify the most relevant and/or sensational scenes within the multi-media content based on the audience's captured mood changes. Embodiments of the present invention can generate promotional content, based on the identified relevant and/or sensational scenes, by extracting and collating the most relevant and/or sensational scenes from the multi-media content to generate interest in viewers to see the full content (e.g., generate a movie trailer).

Embodiments of the present invention can identify the relevant scenes, songs, and/or moments in multi-media content that were widely enjoyed by audience members (i.e., guests of a movie premiere). Embodiments of the present invention can identify the scenes that were poorly received by the audience members and recommend the poorly received scenes for editing, so that during the transmission of the multi-media content, a streaming service or broadcaster can make sure the prime scenes are highlighted. Embodiments of the present invention can rate the identified scenes, songs, and moments in the multi-media content and compare the identified scenes, songs, and/or moments to any other movies on one or more rating sites.

Embodiments of the present invention can identify video contents (e.g., relevant scenes and/or levels) extracted out of video games based on different emotions expressed by one or more audience members (i.e., users). The identified video contents can help video game manufacturers realize and understand how different levels are affecting the users and how involved the users are in the game, levels, and/or characters. The extracted information can help the user improve the way video game manufacturers develop video games by adding similar levels and/or characters based on the levels and/or characters the users enjoyed and suppressing the levels and/or characters the users didn't enjoy. It is known in the art that a healthy comparison of video games is enabled by user engagements, which in turn enables improvements in the field of video game development. Additionally, the enabled improvement described above for video games applies to movies, mobile applications, and/or any multi-media content known in the art.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider. Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
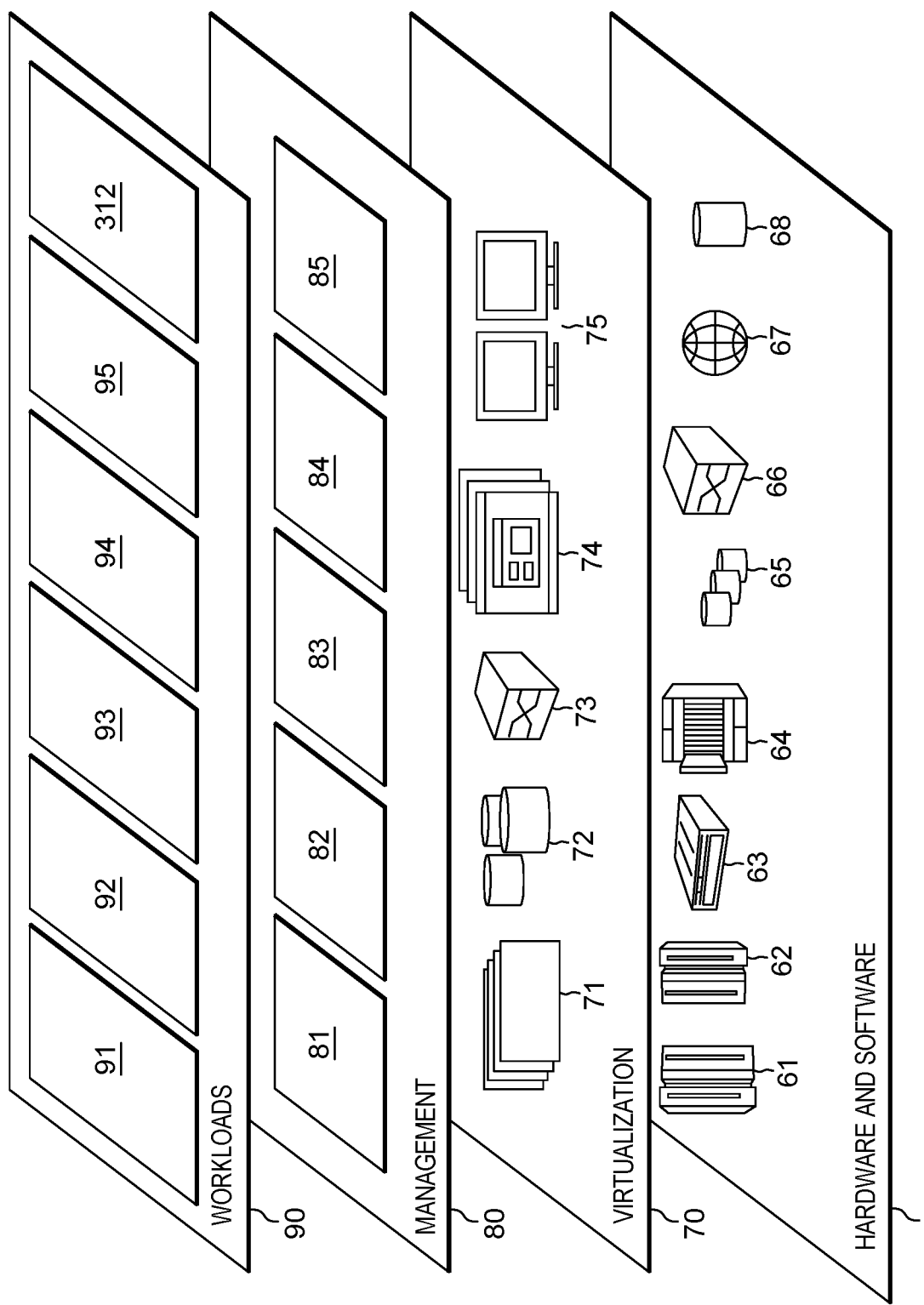
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and multimedia and graphics highlight management component (MGHMC) 312.

Figure 3:
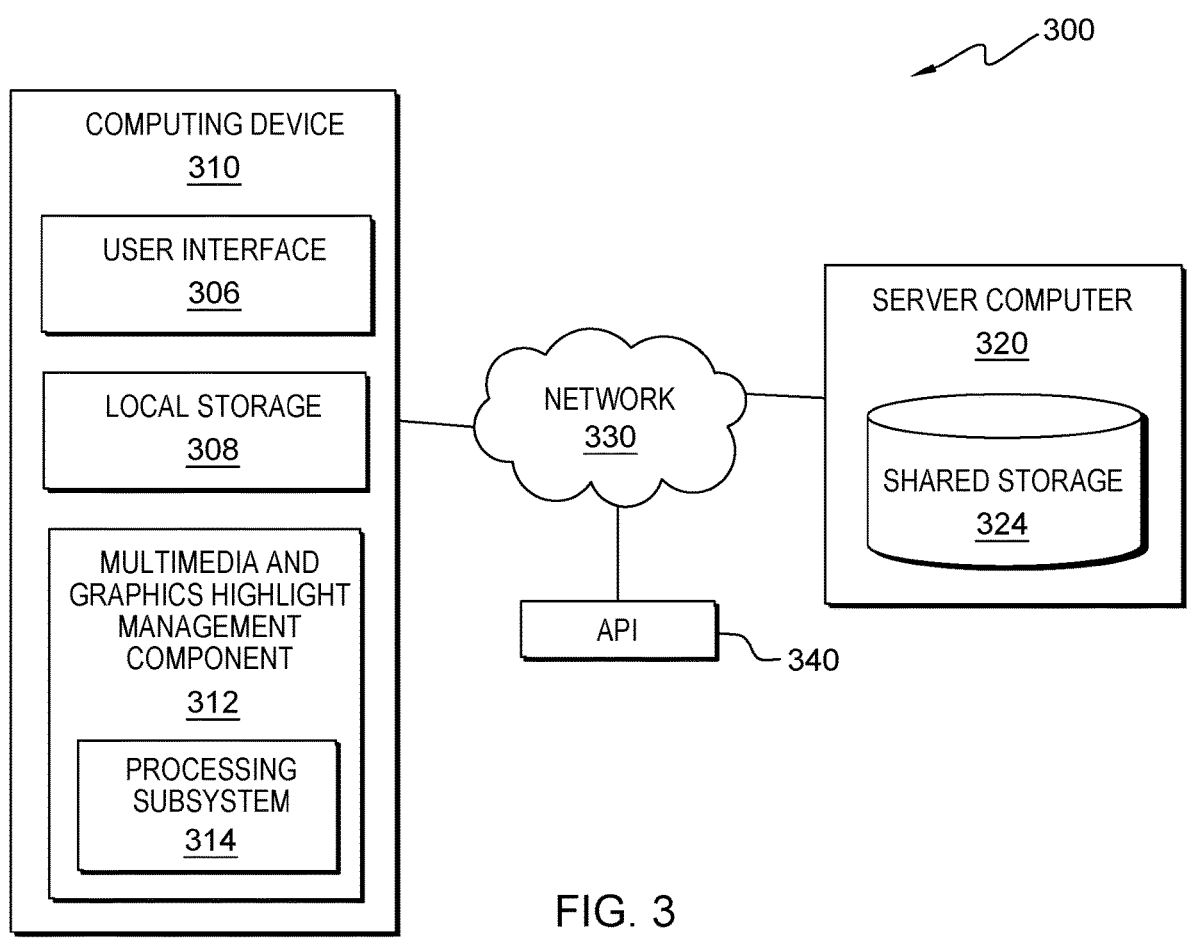
FIG. 3 is a functional block diagram illustrating a distributed data processing environment, in accordance with an embodiment of the present invention.

FIG. 3 is a functional block diagram illustrating distributed data processing environment 300, in accordance with an embodiment of the present invention. Distributed data processing environment 300, can be a cloud computing environment similar to environment 50 in FIG. 1, and includes computing device 310, multimedia and graphics highlight management component (MGHMC) 312, API 340, and server computer 320 interconnected over network 330. In various embodiments, not depicted in FIG. 3, environment 300 can include one or more cameras, in which the one or more cameras are low light camera and the one or more cameras are in communication with computing device 310, API 340, and server computer 320, via network 330. FIG. 3 provides only an illustration of one implementation and does not imply any limitations with regard to the environments in which different embodiments can be implemented. Many modifications to the depicted environment can be made by those skilled in the art without departing from the scope of the invention as recited by the claims.

Network 330 can be, for example, a storage area network (SAN), a telecommunications network, a local area network (LAN), a wide area network (WAN), such as the Internet, a wireless technology for exchanging data over short distances (using short-wavelength ultra-high frequency (UHF) radio waves in the industrial, scientific and medical (ISM) band from 2.4 to 2.485 GHz from fixed and mobile devices, and building personal area networks (PANs) or a combination of the three), and can include wired, wireless, or fiber optic connections. Network 330 can include one or more wired and/or wireless networks that can receive and transmit data, voice, and/or video signals, including multimedia signals that include voice, data, text and/or video information. In general, network 330 can be any combination of connections and protocols that will support communications between computing device 310, API 340, and server computer 320, and any other computing devices and/or storage devices (not shown in FIG. 3) within distributed data processing environment 300.

In various embodiments, computing device 310 can be, but is not limited to, a standalone device, a client, a server, a laptop computer, a tablet computer, a netbook computer, a personal computer (PC), a smart phone, a desktop computer, a smart television, a smart watch, a radio, a stereo system, a cloud based service (e.g., a cognitive cloud based service), and/or any programmable electronic computing device capable of communicating with various components and devices within distributed data processing environment 300, via network 330 or any combination therein. In general, computing device 310 can be representative of any programmable computing device or a combination of programmable computing devices capable of executing machine-readable program instructions and communicating with users of other computing devices via network 330 and/or capable of executing machine-readable program instructions and communicating with server computer 320.

In other embodiments, computing device 310 can represent any programmable electronic computing device or combination of programmable electronic computing devices capable of executing machine readable program instructions, manipulating executable machine-readable instructions, and communicating with server computer 320 and other computing devices (not shown) within distributed data processing environment 300 via a network, such as network 330. Computing device 310 can include an instance of user interface (UI) 306, local storage 308, and/or MGHMC 312. In various embodiments, not depicted in FIG. 3, computing device 310 can comprise one or more cameras. In various embodiments, the one or more cameras can be low light cameras. In other embodiments, the one or more cameras can be any type of camera known in the art. In various embodiments, not depicted in FIG. 3, computing device 310 can have a plurality of user interfaces. In other embodiments, not depicted in FIG. 3, distributed data processing environment 300 can comprise a plurality of computing devices, plurality of server computers, and/or one a plurality of networks. Computing device 310 can include internal and external hardware components, as depicted, and described in further detail with respect to FIG. 5.

User interface (UI) 306 provides an interface to MGHMC 312 on computing device 310. Computing device 310, via user interface 306, can enable a user and/or a client to interact with MGHMC 312 and/or server computer 320 in various ways, such as sending program instructions, receiving program instructions, sending and/or receiving messages, updating data, sending data, inputting data, editing data, collecting data, and/or receiving data. In one embodiment, UI 306 can be a graphical user interface (GUI) or a web user interface (WUI) and can display at least text, documents, web browser windows, user options, application interfaces, and instructions for operation. UI 306 can include information (such as graphic, text, and sound) presented to a user and control sequences the user employs to control operations. In another embodiment, UI 306 can be a mobile application software providing an interface between a user of computing device 310 and server computer 320. Mobile application software, or an "app," can be designed to run on smart phones, tablet computers and other computing devices. In an embodiment, UI 306 can enable the user of computing device 310 to at least send data, input data, edit data (annotations), collect data and/or receive data.

Server computer 320 can be a standalone computing device, a management server, a web server, a mobile computing device, one or more client servers, or any other electronic device or computing system capable of receiving, sending, and processing data. In other embodiments, server computer 320 can represent a server computing system utilizing multiple computers such as, but not limited to, a server system, such as in a cloud computing environment. In another embodiment, server computer 320 can represent a computing system utilizing clustered computers and components (e.g., database server computers, application server computers, etc.) that act as a single pool of seamless resources when accessed within distributed data processing environment 300. Server computer 320 can include internal and external hardware components, as depicted, and described in further detail with respect to FIG. 5.

Each of shared storage 324 and local storage 308 can be a data/knowledge repository and/or a database that can be written and/or read by one or a combination of MGHMC 312, server computer 320 and computing device 310. In the depicted embodiment, shared storage 324 resides on server computer 320 and local storage 308 resides on computing device 310. In another embodiment, shared storage 324 and/or local storage 308 can reside elsewhere within distributed data processing environment 300, provided that each can access and is accessible by computing device 310 and server computer 320. Shared storage 324 and/or local storage 308 can each be implemented with any type of storage device capable of storing data and configuration files that can be accessed and utilized by server computer 320, such as, but not limited to, a database server, a hard disk drive, or a flash memory.

In other embodiments, shared storage 324 and/or local storage 308 can each be a hard drive, a memory card, a computer output to laser disc (cold storage), and/or any form of data storage known in the art. In some embodiments, shared storage 324 and/or local storage 308 can each be one or more cloud storage systems and/or databases linked to a cloud network. In various embodiments, shared storage 324 can access, store, and/or house multi-media content, relevant scene information, social media information, audience member data, and/or data shared throughout distributed data processing environment 300 (e.g., shared data memory).

API 340 can be, for example, a Platform-as-a-Service (PaaS) API, a Software-as-a Service (SaaS) API, an Infrastructure-as-a-Service (IaaS) API, a cloud provider and cross-platform API, a representational state transfer (REST) API, a simple object access protocol (SOAP) API, or any API known in the art. In various embodiments, not depicted in FIG. 3, API 340 can be located and/or executed on server computer 320, computing device 310, and/or anywhere within distributed data processing environment 300 as long as API 340 is interconnected to computing device 310, server computer 320, and/or MGHMC 312 via network 330. In various embodiments, API 340 can monitor and capture historic and current social media and location-specific context information from one or more public social media accounts of audience members (e.g., celebrities, professional gamers, and/or social media influencers) invited to attend a multi-media release (e.g., a movie premiere).

In some embodiments, API 340 can monitor and capture historic and current social media activity and location-specific context information from one or more public social media accounts of celebrities, professional gamers, and/or social media influencers (e.g., audience members) to determine the personality traits, and/or moods of the one or more audience members. In various embodiments, API 340 can determine the mood and/or emotion of an audience member by analyzing a writing style from the audience member's social media posts via a tone analyzer. In various embodiments, API 340 can send the determined mood and/or emotion of the audience member to MGHMC 312, providing MGHMC 312 the capability to preset one or more audience members' moods (e.g., create a baseline mood for a plurality of audience members).

In various embodiments, MGHMC 312 is executed on computing device 310. In other embodiments, MGHMC 312 can be executed on server computer 320. In some embodiments, MGHMC 312 can be located and/or executed anywhere within distributed data processing environment 300. In various embodiments, MGHMC 312 can be connected to and communicates with a cloud-based API (e.g., API 340). In various embodiments, MGHMC 312 can store multi-media content and the multi-media content's related information. Multi-media content related information can be, but is not limited to, a movie genre, length of the movie (e.g., runtime), number of scenes, types of characters, tracked and timed scenes (e.g., funny scene at 05:26, sad scene at 25:01, etc.), movie rating, technical details, story outline, script, video game genre, type of video game (e.g., racing, action/ adventure, etc.), video game rating, and/or any other related information known in the art.

In one example, for movies, MGHMC 312 saves the multi-media content related information, such as the upcoming premiere showing including the premiere show's genre, technical details, and story outline. In another example, for video games, MGHMC 312 saves the different game levels and other technical details as the multi-media content related information. In a different example, for graphic rich software applications, MGHMC 312 records different parameters of an application usage such as mapping between different frames and views of the application and the corresponding mood variation and/or reaction of the user, loading time, time spent on each frame, cancelled usage of dialogue boxes, incorrect usage of dialogue boxes, and unresponsiveness as multi-media content related information.

In various embodiments, MGHMC 312 can assign seating arrangements to invited audience members and manage the seating positions of one or more audience members in an arena. In various embodiments, MGHMC 312 can arrange or assign audience member seating based on individual audience member baseline moods to improve cluster accuracy. For example, MGHMC 312 assigns audience members whose baseline mood is happy or similar to seat together so a clusters mood is preestablished and can be accurately tracked. In some embodiments, MGHMC 312 can seat audience members who have complete opposite baseline moods next to each other. In various embodiments, MGHMC 312 can assign audience members to a seat in order to accurately track mood and facial expression changes of one or more particular audience members.

In various embodiments, MGHMC 312 can generate and manage a guest list for an event. In various embodiments, MGHMC 312 can use the determined personality traits from social media analysis, and/or established moods (e.g., baseline mood) of the one or more audience members to determine which audience member's personality traits and/or mood best matches the multi-media content related information of the movie (e.g., type of movie and genre of the movie). For example, if the audience member's baseline mood is happy, a user (e.g., a marketing director) might want to gauge how deep of a reaction the movie can obtain; therefore, MGHMC 312 can assign the audience member to a sad movie. In various embodiments, MGHMC 312 can send invitations to persons listed on the guest list. In various embodiments, MGHMC 312 can store audience responses that were captured during a show or event.

In various embodiments, MGHMC 312 can continuously capturing one or more audience members' reactions from the time the multi-media content begins playing until the multi-media content ends (e.g., stops playing). In various embodiments, not depicted in FIG. 3, MGHMC 312 can capture the reactions of one or more audience members via low light capturing cameras, wherein the low light cameras are attached to the head rest on the seat in front of the audience members. In another embodiment, low light cameras can be positioned throughout the venue where a premier or multi-media release is occurring, in which each camera is designated to monitor and capture the mood for a portion of the audience. For example, a first camera monitors and captures the emotions/moods from audience members in seats 1-5 in rows 1-3, a second camera monitors and captures the emotions/moods from audience members in seats 6-10 in rows 1-3, etc. In some embodiments, the low light cameras are positioned in the rafters or on cables above the audience. In various embodiments, MGHMC 312 can send the captured images of the audience to a facial expression analyzer, not depicted in FIG. 3.

In some embodiments, not depicted in FIG. 3, the facial expression analyzer can be a component of MGHMC 312. In various embodiments, the facial expression analyzer can analyze the captured images for movements in the audience's eyebrows, mouth, eyes, and/or other facial movements known in the art. In various embodiments, the facial expression analyzer can identify the expression of one or more persons (e.g., guests/audience members) from the captured images based on preset training samples of facial expressions and emotions. Additionally, in various embodiments, the facial expression analyzer can identify the expression of one or more persons (e.g., guests/audience members) from the captured images through one or more emotion APIs, not depicted in FIG. 3, that can detect emotions like anger, fear, joy, neutral, sadness, surprise, and/or any other emotion known in the art. In various embodiments, the facial expression analyzer can map the identified facial expressions against the time lapsed in the played multi-media content (e.g., movie) to determine which scene causes one or more audience members to react/express emotion (e.g., smile, laugh, cry, etc.).

In various embodiments, MGHMC 312 can receive responses from multi-modal sensors, not depicted in FIG. 3, for the analysis of visual features, acoustic features, linguistic features, and physical features from multi-media content with the help of machine learning algorithms to extract an emotional state out of each level or a scene of a game. In one particular embodiment, MGHMC 312 can continuously capture the emotional state of one or more levels or scenes of a game, via multi-modal sensors. Additionally, in this particular embodiment, MGHMC 312 can continuously capture one or more user's and/or one or more audience member's reactions while the one or more users play the video game. Additionally, in this particular embodiment, MGHMC 312 can analyze the captured emotional state of the one or more levels or scenes against the captured reactions of the one or more users and/or one or more audience members. In this particular embodiment, MGHMC 312 can store and process the captured scenes and game levels. In other embodiments, MGHMC 312 can capture a stadium of audience members' reactions while the audience members watch a video game tournament, video game play, and/or a release trailer of the video game.

In various embodiments, MGHMC 312 can group audience response to form clusters, in which one or more clusters comprise audience members who share similar baseline moods. In various embodiments, MGHMC 312 can input and/or send the one or more clusters to processing subsystem 314. In depicted embodiment, processing subsystem 314 is a component of MGHMC 312. In other embodiments, processing subsystem 314 can be located anywhere within distributed data processing environment 300 as long as subsystem 314 is interconnected to computing device 310, server computer 320, and/or MGHMC 312 via network 330. In various embodiments, processing subsystem 314 can continuously identify the facial expression and continuously determine the mood of one or more audience members from the one or more clusters while multi-media content is playing. In various embodiments, processing subsystem 314 can plot the determined audience member moods against playing multi-media content (e.g., match the captured reaction and/or determined mood to scenes in the played multi-media content).

In various embodiments, processing subsystem 314 can weigh the captured emotions based on one or more audience members who shared the same or substantially similar moods during a particular scene or part of played multi-media content. In various embodiments, processing subsystem 314 can map one or more audience members in one or more clusters to one or more emotions against time. In various embodiments, processing subsystem 314 can comprise one or more cognitive APIs, in which the one or more cognitive APIs can understand emotions based on captured visuals (e.g. images and/or video), audio analysis, and scene composition analysis. In various embodiments, the one or more cognitive APIs identify one or more scenes from the played multi-media content and map the identified one or more scenes against time to generate a time map of one or more scenes in the multi-media content.

In various embodiments, processing subsystem 314 can map the identified scenes with the one or more recorded audience members responses against one or more clusters with one or more scenes being given weight against the one or more recorded audience members responses in each cluster. In one particular embodiment, the largest cluster getting mapped to a particular scene can identify the actual audience members experience and/or reaction to the particular scene. In various embodiments, processing subsystem 314 can send the recorded audience members experience, reactions and/or moods to MGHMC 312. In various embodiments, MGHMC 312 can output relevant scenes based on the need to improve the audience member experience. Relevant scenes identified from the multi-media content can be used for promotional events and advertising as well as collecting feedback. In various embodiments, the parts/scenes of the multi-media content that are not impacting (e.g., do not invoke mood or reaction changes from the audience members) can be recommended to one or more editors and/or producers to be removed from the multi-media content. In various embodiments, MGHMC 312 determines relevant scenes in multi-media content by tracking the movement of audience members between clusters for one or more scenes while the multi-media content is playing. In this particular embodiment, MGHMC 312 can map audience members' movement between clusters to identify which scenes invoke the audience members' reaction/mood.

In various embodiments, the processing subsystem can receive emotional data from an audience member's baseline and/or captured audience member reactions and/or moods throughout the played multi-media content (e.g., movie premiere) to form clusters of audience members. For example, the processing subsystem receives one or more audience members baseline moods and forms clusters of audience members, in which the clusters group audience members based on a common age group, and shared common moods against one or more scenes or levels. In various embodiments, one or more clusters can begin with audience members belonging to similar age groups and common baseline moods. For example, the processing subsystem generates clusters for a new family movie based on an audience's predetermined baseline moods. In this particular example, the clusters are depicted as:

Cluster A1 {type: "happy", age: "30-40" time: "0:00", name: {"a1", "a2", "a3", . . . }}
Cluster B1 {type: "neutral", age: "30-40" time: "0:00", name: {"b1", "b2", "b3", . . . }}
Cluster A2 {type: "joyful", age: "30-40" time: "0:00", name: {"a5", "a6", "A7", . . . }}
Cluster B2 {type: "sad", age: "30-40" time: "0:00", name: {"b5", "b6", "b7", . . . }}

In this particular example, as the movie progresses, content from the movie is mapped to the clusters against time as shown below:

Cluster A1 {type: "joyful", age: "30-40" time:"3:00", name: {"a1 ", "a6", "a5", . . . }}
Cluster B1 {type: "happy", age: "30-40" time:"3:00", name: {"b6", "b2", "b5", . . . }}
Cluster A2 {type: "sad", age: "30-40" time:"3:00", name: {"a5", "a2", "A3", . . . }}
Cluster B2 {type: "neutral", age: "30-40" time:"3:00", name: {"b1", "b3", "b7", . . . }}

In various embodiments, one or more scenes can be identified and labeled by MGHMC 312, via scene composition analysis. For example, while MGHMC 312 conducts a scene composition analysis of a family movie, MGHMC 312 identifies a funny scene at time:"00:15" (i.e., minute 15), a sad scene at time:"00:45", etc. In various embodiments, MGHMC 312 can map the identified and labeled scenes to the one or more audience members' identified reactions. In various embodiments, MGHMC 312 can evaluate the percentage increase in one or more clusters to determine the overall audience experience against the played multi-media content at any given time during the event. In various embodiments, MGHMC 312 can assign the highest positive ranking to the cluster that has a superlative emotion in relation to the identified emotion of a particular scene and the lowest ranking to the cluster representing the emotion that overlaps with the emotion identified in a particular scene.

For example, to measure the effectiveness of a happy scene, MGHMC 312 takes the initial clusters, demonstrated below:

Cluster A1 {type: "joyful", age: "30-40" time:"3:00", name: {"a1", "a6", "a5", . . . }}
Cluster B1 {type: "happy", age: "30-40" time:"3:00", name: {"b6", "b2", "b5", . . . }}
Cluster A2 {type: "sad", age: "30-40" time:"3:00", name: {"a5", "a2", "A3", . . . }}
Cluster B2 {type: "neutral", age: "30-40" time:"3:00", name: {"b1", "b3", "b7", . . . }}

In this particular example, MGHMC 312 takes all the positive emotion clusters (i.e., joyful, happy, etc.) in the generated clusters including the neutral cluster and ranks the clusters based on the tone of the cluster emotion towards the emotion of a particular scene which is 'happy'. In this particular example, joyful being a superlative word for happy, the joyful cluster gets the highest ranking. In this particular example, the happy cluster being the same mood as the mood in the identified scene gets a normal ranking and the neutral cluster gets the lowest ranking. In various embodiments, MGHMC 312 can determine the overall effectiveness (e.g., relevant scenes) of one or more scenes by analyzing the movement of audience members between clusters. For example, MGHMC 312 analyzes the percentage of audience members that have moved from a negative or neutral cluster to a positive cluster. In the particular example, the percentage of audience members that moved from negative clusters to positive clusters are added to the respective weights of positive clusters to determine the overall effectiveness of a scene. In various embodiments, if the movement or concentration of audience members for a particular scene is above a predetermined threshold, then MGHMC 312 can identify that particular scene as a relevant scene.

In one particular example, for a movie, MGHMC 312 schedules the premiere showing and manages the audience members by sending invites based on a multi-media producer's request. For example, a movie producer requests MGHMC 312 to send the location and time of the movie premiere to a guest list input by the movie producer. In this particular example, MGHMC 312 identifies the seating positions of every audience member inside the theatre, and, via API 340, captures celebrities (i.e., audience members) social media activity to create a baseline mood for every audience member in attendance. In this particular example, once the movie begins, MGHMC 312 can capture audience members' facial expressions while the movie is playing, via low light capturing cameras. In this particular example, MGHMC 312 identifies the audience members mood and expression associated with all scenes by analyzing the captured facial expressions, via processing subsystem 314. Additionally, in this particular example, MGHMC 312 tracks the audience members' reaction to scenes in the film and identifies relevant scenes by identifying which scenes cause the most audience members to react.

In one particular embodiment, for a video game, MGHMC 312 can identify a registered user, via facial recognition or any other form of biometric security known in the art, not depicted in FIG. 3. In other embodiments, if MGHMC 312 is unable to identify a user, then the user can be identified as anonymous. Continuing the particular embodiment above, API 340 can capture the social media activity of the user to establish the user's baseline mood. In this particular embodiment, once the video game begins, MGHMC 312, can retrieve and/or receive responses from the multi modal sensors analyze the visual features, acoustic features, linguistic features and physical features of the game, via machine learning algorithms, to extract an emotional state out of each level or a scene of the video game. In this particular embodiment, MGHMC 312 can continuously capture the user's reaction to the video game while the user plays. In this particular embodiment, MGHMC 312 can identify and output game levels and/or scenes that cause the users to react and/or exceed a predetermined threshold. For example, if the level causes the user to express excitement or amazement, then MGHMC 312 can identify these levels as relevant levels. In various embodiments, the continuously captured user reactions can be tracked and/or analyzed by processing subsystem 314.

In one particular embodiment, for a website/mobile application, MGHMC 312 can identify a registered user, via facial recognition or any other form of biometric security known in the art, not depicted in FIG. 3. In other embodiments, if MGHMC 312 is unable to identify a user, then the user can be identified as anonymous. Continuing the particular embodiment above, API 340 can capture the social media activity of the user to establish the user's baseline mood. In this particular embodiment, once the interaction between the user and the website (e.g., application) begins, MGHMC 312 can retrieve and/or receive responses and captured images from the multi modal sensors and webcameras to analyze the visual features, acoustic features, linguistic features, other parameters such as time spent on one or more frames, used/cancelled/reworked frames, and physical features of the website, via machine learning algorithms commonly known in the art, to extract an emotional state out of one or more levels or scenes of the website.

In this particular embodiment, MGHMC 312 can continuously capture the user's reaction to the website while the user interacts with the website. In this particular embodiment, MGHMC 312 can identify scenes and/or images from the website that cause the user to react and/or exceed a predetermined threshold. For example, if a scene causes the user to express excitement or amazement then MGHMC 312 can identify that scene as a relevant scene. In various embodiments, the continuously captured user reactions can be tracked and/or analyzed by processing subsystem 314. In various embodiments, MGHMC 312 can output, retrieve, and/or receive a survey associated with the website/mobile application to generate a summary of insights. In various embodiments, MGHMC 312 can collect the summary of insights to generate a net promoter score (NPS) for the website/mobile application. In various embodiments, MGHMC 312 can generate a custom survey based on the identified relevant scenes and/or characteristics of the website/mobile application.

Figure 4:
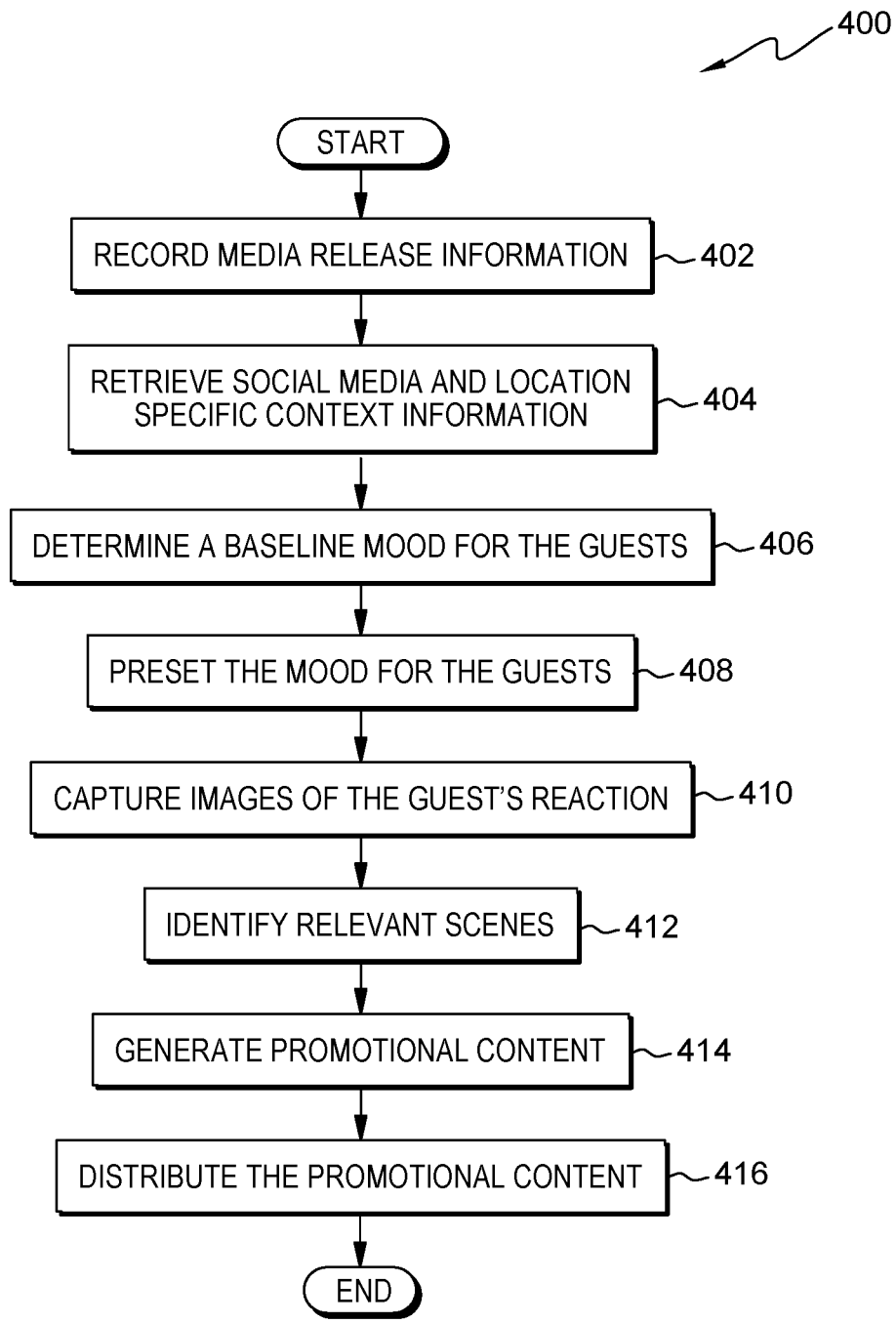
FIG. 4 is a flowchart illustrating operational steps of a multimedia and graphics highlight management component, in communication with a server computer within the distributed data processing environment of FIG. 3, for improving user consumption of multi-media content, in accordance with an embodiment of the present invention.

FIG. 4 illustrates operational steps of MGHMC 312, generally designated 400, in communication with server computer 320 within distributed data processing environment 300 of FIG. 3, for improving user consumption of multi-media content, in accordance with an embodiment of the present invention. FIG. 4 provides an illustration of one implementation and does not imply any limitations with regard to the environments in which different embodiments can be implemented. Many modifications to the depicted environment can be made by those skilled in the art without departing from the scope of the invention as recited by the claims.

In step 402, MGHMC 312 records media release information. In various embodiments, MGHMC 312 can receive and/or record one or more media release information. In some embodiments, MGHMC 312 can generate a guest list for an event for the media release event. In various embodiments, MGHMC 312 can manage and send invitations to the guest list. In various embodiments, MGHMC 312 can arrange the audience member seating order and book the venue for the media release event.

In step 404, MGHMC 312 retrieves social media and location-specific context information. In various embodiments, MGHMC 312 can monitor and retrieve social media and location-specific context information of one or more audience members attending a media release event from one or more social media platforms.

In step 406, MGHMC 312 determines a baseline mood for the audience members. In various embodiments, MGHMC 312 can determine a baseline mood for the one or more audience members based on the retrieved social media and location-specific context information. For example, MGHMC 312 determines a baseline mood for each audience member attending a movie premier based on each audience members social media posts/activity.

In step 408, MGHMC 312 presets the mood for the audience members. In various embodiments, MGHMC 312 can preset the mood for one or more audience members in attendance based on the determined baseline mood of the one or more audience members. In various embodiments, presetting an audience member's mood can comprise generating mood clusters and assigning the audience member to a cluster based on the audience member's determined baseline mood.

In step 410, MGHMC 312 captures images of the audience member's reactions. In various embodiments, MGHMC 312 can continuously capture images of the audience member's reactions to the multi-media content while the multi-media content is playing. For example, continuously capturing an audience member's reaction while the movie is playing. In various embodiments, MGHMC 312 can track the audience member's reactions and movement between clusters.

In step 412, MGHMC 312 identifies relevant scenes. In various embodiments, MGHMC 312 can identify one or more relevant scenes in multi-media content based on the tracking of audience member reactions and movement between clusters and a predetermined concentration of audience members in desired clusters. For example, if the screened movie is a comedy and a scene causes audience member reactions to move from neutral or negative clusters to positive clusters (e.g., happy, laughing, smiling, joyful, etc.) then the scene that caused the positive reaction is a relevant scene.

In step 414, MGHMC 312 generates promotional content. In various embodiments, MGHMC 312 can generate promotion content based on the one or more identified relevant scenes in a multi-media content. In some embodiments, MGHMC 312 can generate promotional videos and/or movie trailers for a movie.

In step 416, MGHMC 312 distributes the promotional content. In various embodiments, MGHMC 312 can send the promotional content to the audience members that attended a screening event and instruct them to post the promotional content on their social media account. In other embodiments, MGHMC 312 can send and distribute the promotional content to producers, movie theatres, streaming services, television networks, social media influencers, social media service company, social networking service company, and/or internet providers.

Figure 5:
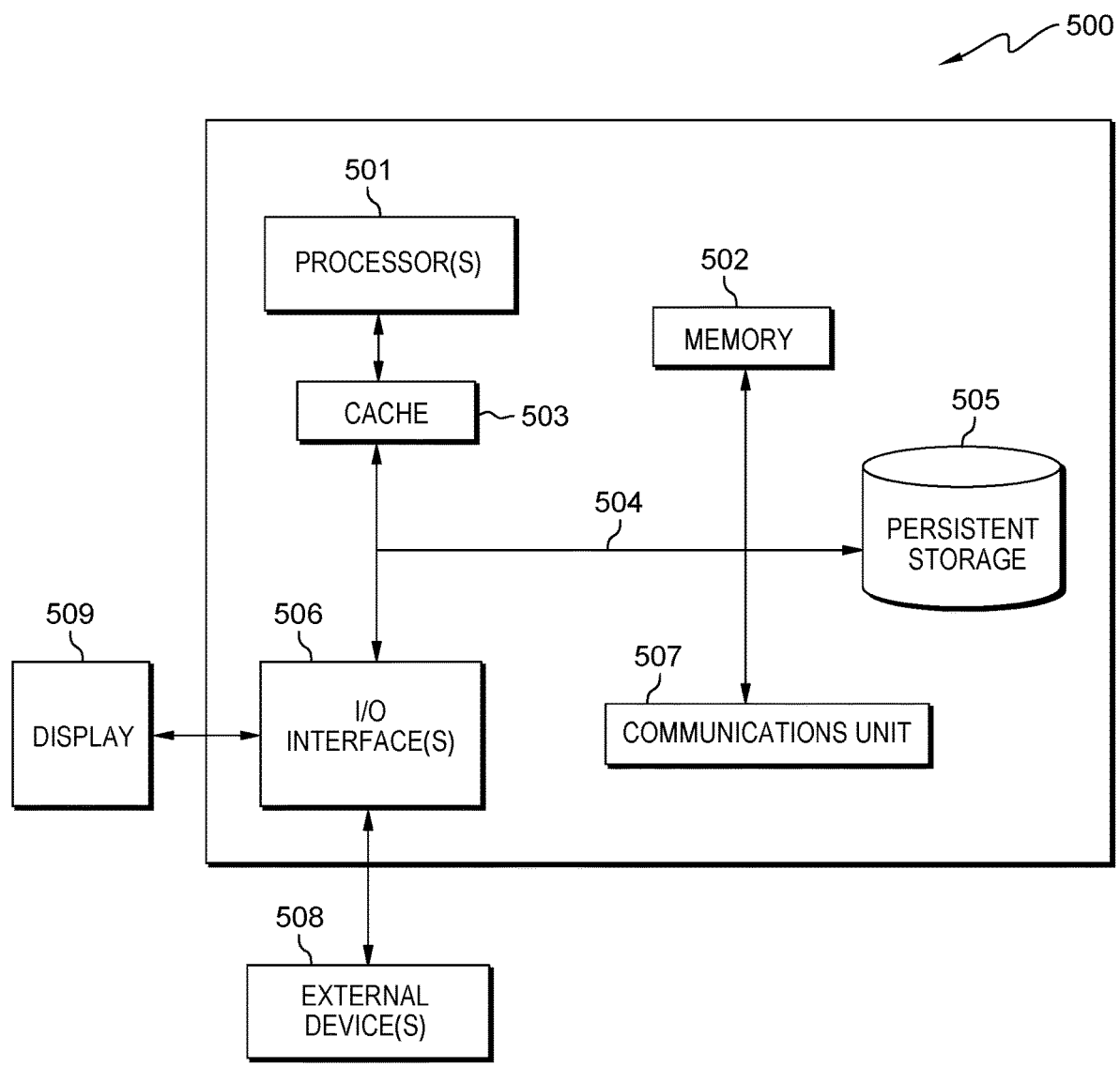
FIG. 5 depicts a block diagram of components of a computing device and a server computer executing the multimedia and graphics highlight management component within the distributed data processing environment of FIG. 3 in accordance with an embodiment of the present invention.

FIG. 5 depicts computer system 500, where server computer 320 represents an example of computer system 500 that includes OC 312. The computer system includes processors 501, cache 503, memory 502, persistent storage 505, communications unit 507, input/output (I/O) interface(s) 506, display 509, external device(s) 508 and communications fabric 504. Communications fabric 504 provides communications between cache 503, memory 502, persistent storage 505, communications unit 507, and input/output (I/O) interface(s) 506. Communications fabric 504 can be implemented with any architecture designed for passing data and/or control information between processors (such as microprocessors, communications, and network processors, etc.), system memory, peripheral devices, and any other hardware components within a system. For example, communications fabric 504 can be implemented with one or more buses or a crossbar switch.

Memory 502 and persistent storage 505 are computer readable storage media. In this embodiment, memory 502 includes random access memory (RAM). In general, memory 502 can include any suitable volatile or non-volatile computer readable storage media. Cache 503 is a fast memory that enhances the performance of processors 501 by holding recently accessed data, and data near recently accessed data, from memory 502.

Program instructions and data used to practice embodiments of the present invention can be stored in persistent storage 505 and in memory 502 for execution by one or more of the respective processors 501 via cache 503. In an embodiment, persistent storage 505 includes a magnetic hard disk drive. Alternatively, or in addition to a magnetic hard disk drive, persistent storage 505 can include a solid-state hard drive, a semiconductor storage device, read-only memory (ROM), erasable programmable read-only memory (EPROM), flash memory, or any other computer readable storage media that is capable of storing program instructions or digital information.

The media used by persistent storage 505 can also be removable. For example, a removable hard drive can be used for persistent storage 505. Other examples include optical and magnetic disks, thumb drives, and smart cards that are inserted into a drive for transfer onto another computer readable storage medium that is also part of persistent storage 505.

Communications unit 507, in these examples, provides for communications with other data processing systems or devices. In these examples, communications unit 507 includes one or more network interface cards. Communications unit 507 can provide communications through the use of either or both physical and wireless communications links. Program instructions and data used to practice embodiments of the present invention can be downloaded to persistent storage 505 through communications unit 507.

I/O interface(s) 506 enables for input and output of data with other devices that can be connected to each computer system. For example, I/O interface 506 can provide a connection to external devices 508 such as a keyboard, keypad, a touch screen, and/or some other suitable input device. External devices 508 can also include portable computer readable storage media such as, for example, thumb drives, portable optical or magnetic disks, and memory cards. Software and data used to practice embodiments of the present invention can be stored on such portable computer readable storage media and can be loaded onto persistent storage 505 via I/O interface(s) 506. I/O interface(s) 506 also connect to display 509.

Display 509 provides a mechanism to display data to a user and can be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention can be a system, a method, and/or a computer program product. The computer program product can include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general-purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, a segment, or a portion of instructions, which comprises one or more executable instructions for implementing the specified logical function(s). In some alternative implementations, the functions noted in the blocks can occur out of the order noted in the Figures. For example, two blocks shown in succession may, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for improving promotion and user consumption of multi-media content, the method comprising:
retrieving, by a cloud-based application programing interface, social media and location-specific context information from one or more social media platforms associated with one or more audience members;
monitoring, by the one or more processors, historic and current social media and the location-specific context information from one or more public social media accounts associated with the one or more audience members;
capturing, by the one or more processors, the historic and the current social media and the location-specific context information from the one or more public social media accounts associated with the one or more audience members;
analyzing, by the one or more processors, a writing style of the captured the historic and the current social media and the location-specific context information associated with the one or more audience members to determine a mood for the one or more audience members;
creating, by the cloud-based application programing interface one or more processors, a baseline mood for the one or more audience members based on the one or more audience member's determined mood, social media activity, and social media posts;

capturing, by low light cameras and an image processing system, one or more images of one or more audience member reactions while the one or more audience members view the multi-media content;

identifying, by one or more processors using facial expression analysis, relevant scenes in the multi-media content based on the captured one or more audience member reactions;

generating, by the one or more processors, promotional content based on the identified relevant scenes; and distributing, by the one or more processors, the promotional content on the one or more social media platforms.

2. The method of claim 1 further comprising:

recording, by the one or more processors, media release information for the multi-media content;

presetting, by the one or more processors, the mood for the one or more audience members based on the determined baseline mood for the one or more audience members.

3. The method of claim 1 further comprising:

managing, by the one or more processors, media release information, invitation list, and seating arrangement of the one or more audience members.

4. The method of claim 1, wherein identifying the relevant scenes in the multi-media content further comprising:

generating, by the one or more processors, a plurality of clusters based on the one or more audience members determine moods and captured one or more audience member reactions, wherein the plurality of clusters represent a different mood and the one or more audience members are mapped to the plurality of clusters based on the one or more audience members' moods while multi-media content is playing.

5. The method of claim 4 further comprising:

mapping, by the one or more processors, the one or more audience member's mood changes and cluster movement based on the captured one or more audience member reactions to a particular scene in the multi-media content.

6. The method of claim 5 further comprising:

tracking, by the one or more processors, the one or more audience member's mood changes and cluster movement while the multi-media content is playing.

7. A computer program product for improving promotion and user consumption of multi- media content, the computer program product comprising:

one or more computer readable storage mediums and program instructions stored on the one or more computer readable storage mediums, the stored program instructions comprising:

program instructions to retrieve, by a cloud-based application programing interface, social media and location-specific context information from one or more social media platforms associated with one or more audience members;

program instructions to monitor historic and current social media and the location-specific context information from one or more public social media accounts associated with the one or more audience members;

program instructions to capture the historic and the current social media and the location-specific context information from the one or more public social media accounts associated with the one or more audience members;

program instructions to analyze a writing style of the captured the historic and the current social media and the location-specific context information associated with the one or more audience members to determine a mood for the one or more audience members;

program instructions to creating, by a cloud-based application program interface, the baseline mood for the one or more audience members based on the one or more audience member's determined mood, social media activity, and social media posts;

program instructions to capture, by one or more low light cameras and an image processing system, one or more images of one or more audience member reactions while the one or more audience members view the multi-media content;

program instructions to identify, using facial expression analysis, relevant scenes in the multi-media content based on the captured one or more audience member reactions;

program instructions to generate promotional content based on the identified relevant scenes; and program instructions to distribute the promotional content on the one or more social media platforms.

8. The computer program product of claim 7 further comprising:

program instructions to record media release information for the multi-media content;

program instructions to preset the mood for the one or more audience members based on the determined baseline mood for the one or more audience members.

9. The computer program product of claim 7 further comprising:

program instructions to manage media release information, invitation list, and seating arrangement of the one or more audience members.

10. The computer program product of claim 7, wherein identifying the relevant scenes in the multi-media content further comprising:

program instructions to generate a plurality of clusters based on the one or more audience members determine moods and captured one or more audience member reactions, wherein the plurality of clusters represent a different mood and the one or more audience members are mapped to the plurality of clusters based on the one or more audience members' moods while multi-media content is playing.

11. The computer program product of claim 10 further comprising:

program instructions to map the one or more audience member's mood changes and cluster movement based on the captured one or more audience member reactions to a particular scene in the multi-media content.

12. The computer program product of claim 11 further comprising:

program instructions to track the one or more audience member's mood changes and cluster movement while multi-media content is playing.

13. A computer system for improving promotion and user consumption of multi-mediacontent, the computer system comprising:

one or more computer processors;

one or more computer readable storage devices;

program instructions stored on the one or more computer readable storage devices for execution by at least one of the one or more computer processors, the stored program instructions comprising:

program instructions to retrieve, by a cloud-based application programing interface, social media and location-specific context information from one or more social media platforms associated with one or more audience members;

program instructions to monitor historic and current social media and the location-specific context information from one or more public social media accounts associated with the one or more audience members;

program instructions to capture the historic and the current social media and the location-specific context information from the one or more public social media accounts associated with the one or more audience members;

program instructions to analyze a writing style of the captured the historic and the current social media and the location-specific context information associated with the one or more audience members to determine a mood for the one or more audience members;

program instructions to creating, by a cloud-based application program interface, the baseline mood for the one or more audience members based on the one or more audience member's determined mood, social media activity, and social media posts;

program instructions to capture, by one or more low light cameras and an image processing system, one or more images of one or more audience member reactions while the one or more audience members view the multi-media content;

program instructions to identify, using facial expression analysis, relevant scenes in the multi-media content based on the captured one or more audience member reactions;

program instructions to generate promotional content based on the identified relevant scenes; and program instructions to distribute the promotional content on the one or more social media platforms.

14. The computer system of claim 13 further comprising:
program instructions to record media release information for the multi-media content;
program instructions to preset the mood for the one or more audience members based on the determined baseline mood for the one or more audience members.

15. The computer system of claim 13 further comprising:
program instructions to manage media release information, invitation list, and seating arrangement of the one or more audience members.

16. The computer system of claim 13, wherein identifying the relevant scenes in the multi-media content further comprising:
program instructions to generate a plurality of clusters based on the one or more audience members determine moods and captured one or more audience member reactions, wherein the plurality of clusters represent a different mood and the one or more audience members are mapped to the plurality of clusters based on the one or more audience members' moods while multi-media content is playing.

17. The computer system of claim 16 further comprising:
program instructions to map the one or more audience member's mood changes and cluster movement based on the captured one or more audience member reactions to a particular scene in the multi-media content; and
program instructions to track the one or more audience member's mood changes and cluster movement while multi-media content is playing.

* * * * *